United States Patent [19]

Mukae et al.

[11] Patent Number: 4,584,049

[45] Date of Patent: Apr. 22, 1986

[54] RADIAL TIRE FORMING BLANK SUPPLY APPARATUS

[75] Inventors: Makito Mukae, Higashimurayama; Yusuke Araki, Kodaira, both of Japan

[73] Assignee: Bridgestone Corporation, Tokyo, Japan

[21] Appl. No.: 649,774

[22] Filed: Sep. 12, 1984

[30] Foreign Application Priority Data

Oct. 5, 1983 [JP] Japan .................. 58-185113

[51] Int. Cl.⁴ .................................. B27H 17/00
[52] U.S. Cl. .................. 156/396; 156/406.2; 156/111; 156/126
[58] Field of Search .......... 156/396, 406.2, 110.1, 156/111, 126–127, 128.1

[56] References Cited

U.S. PATENT DOCUMENTS

| | | | |
|---|---|---|---|
| 3,909,335 | 9/1975 | Jellison | 156/396 |
| 3,909,336 | 9/1975 | Takahashi et al. | 156/396 |
| 4,039,365 | 8/1977 | Takasuga et al. | 156/396 |
| 4,462,776 | 7/1984 | Fujimoto et al. | 156/396 |
| 4,473,427 | 9/1984 | Irie | 156/396 |

FOREIGN PATENT DOCUMENTS

| | | | |
|---|---|---|---|
| 57-107829 | 7/1982 | Japan | 156/406.2 |
| 57-107830 | 7/1982 | Japan | 156/406.2 |
| 57-142345 | 9/1982 | Japan | 156/406.2 |
| 58-28364 | 2/1983 | Japan | 156/396 |
| 0743897 | 6/1980 | U.S.S.R. | 156/396 |

*Primary Examiner*—Lois E. Boland
*Attorney, Agent, or Firm*—Sughrue, Mion, Zinn, Macpeak & Seas

[57] ABSTRACT

A radial tire forming blank supply apparatus for use in a radial tire building machine comprises a column rotatable about a vertical axis spaced from the rotating axis of a forming drum, a pair of cantilever beams one above the other provided on the column, and two pairs of bar-like clamps. Each the pair of bar-like clamps are secured to each the cantilever beam and movable radially toward and away from each other to clamp and release a green case therebetween. According to the invention the main carriage serving to fit a green case onto the forming drum does not interfere with any process steps to which the green case on the forming drum is subjected, during the interval from the time when the main carriage leaves the forming drum to the time when the main carriage is ready for receiving the next green case, so that the loss of time in transferring and handling the green case is completely eliminated in spite that the guide rails for the main carriage are commonly used for supplying tread bands, thereby remarkably improving the efficiency in production process of radial tires and contributing to saving space occupied by tire producing installations.

9 Claims, 11 Drawing Figures

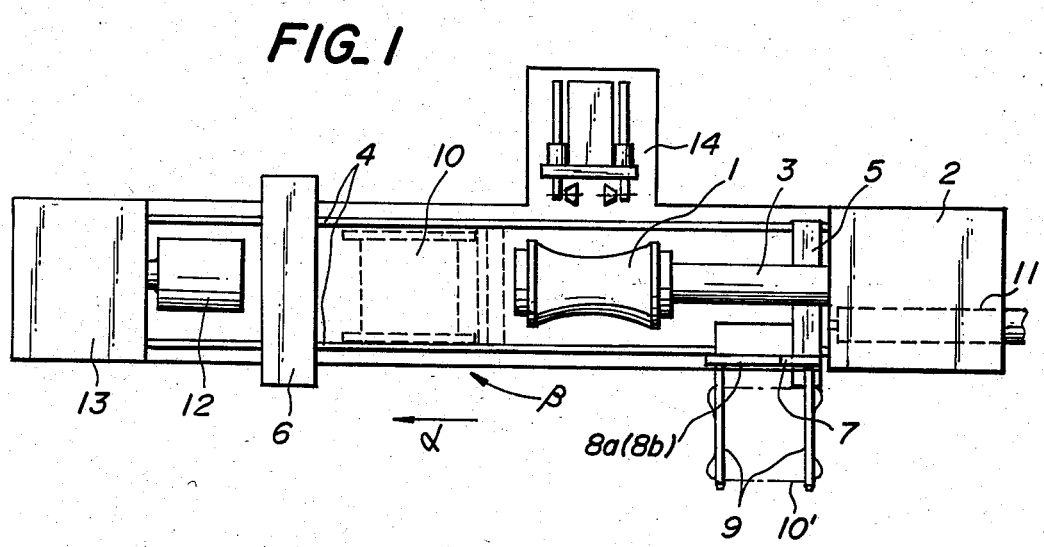
FIG_1
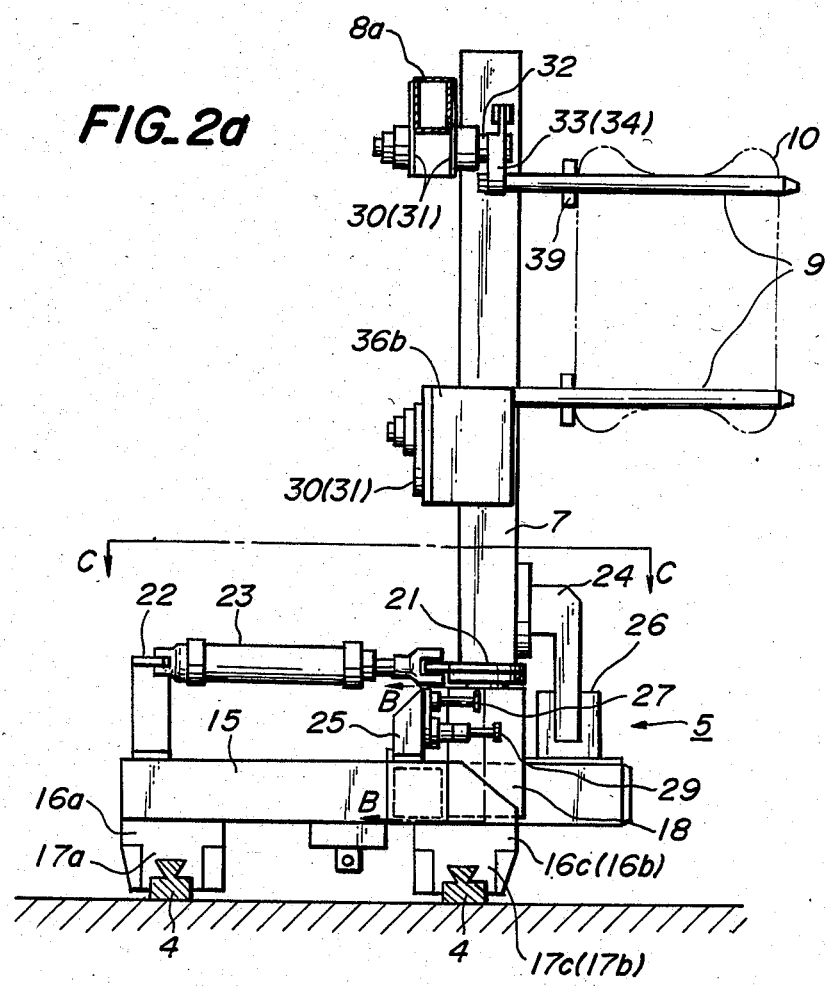
FIG_2a

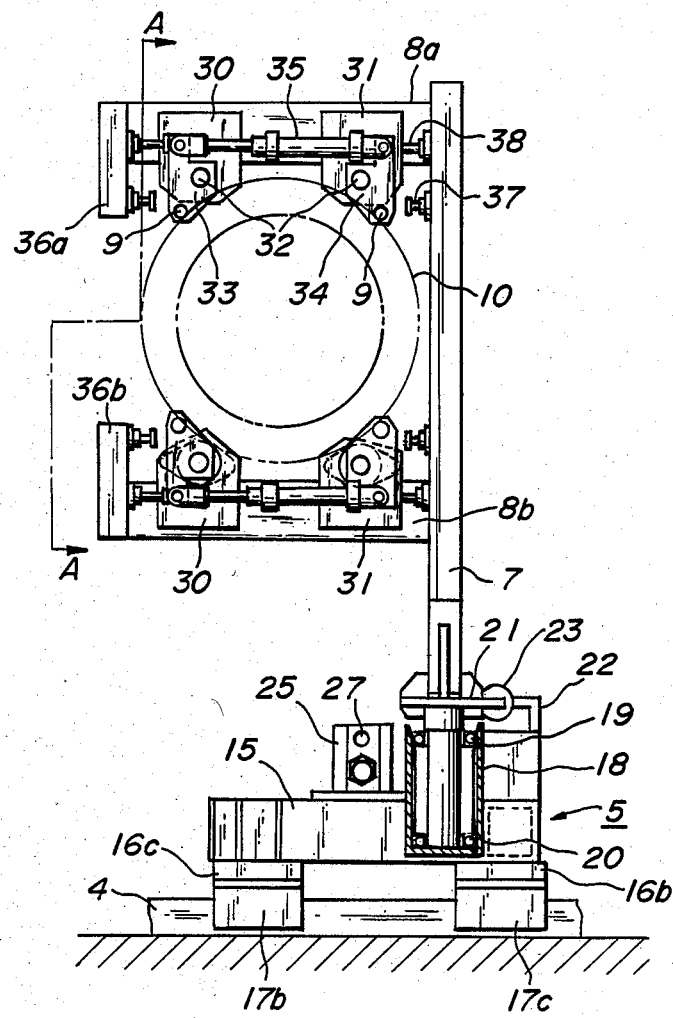
FIG_2b
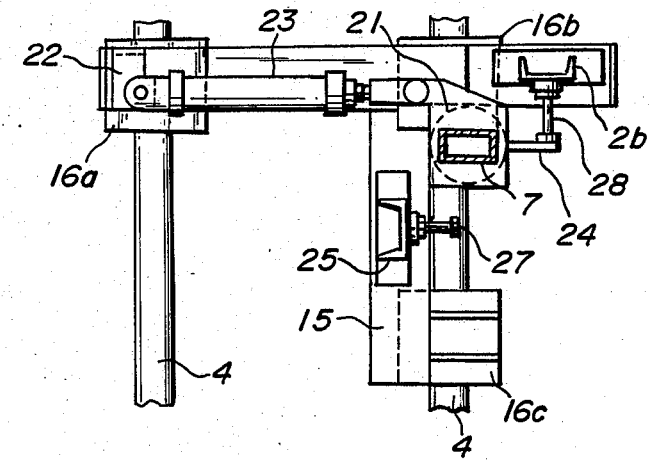
FIG_2c

FIG_3a
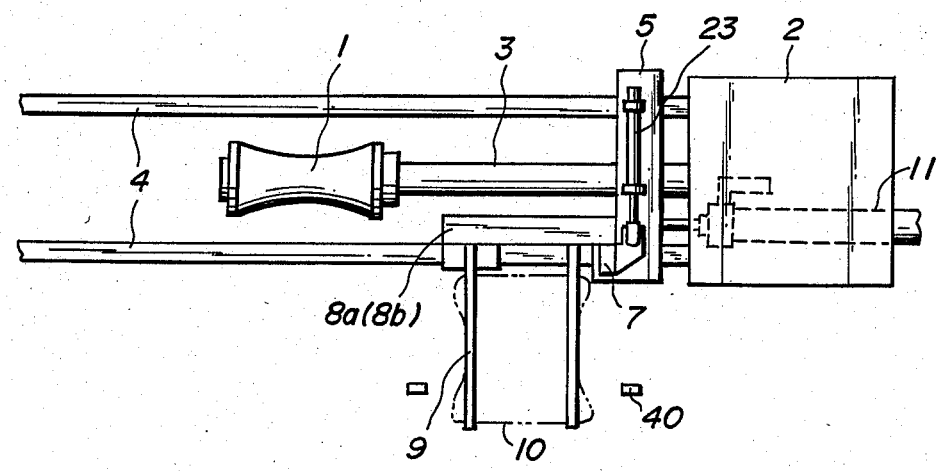
FIG_3b
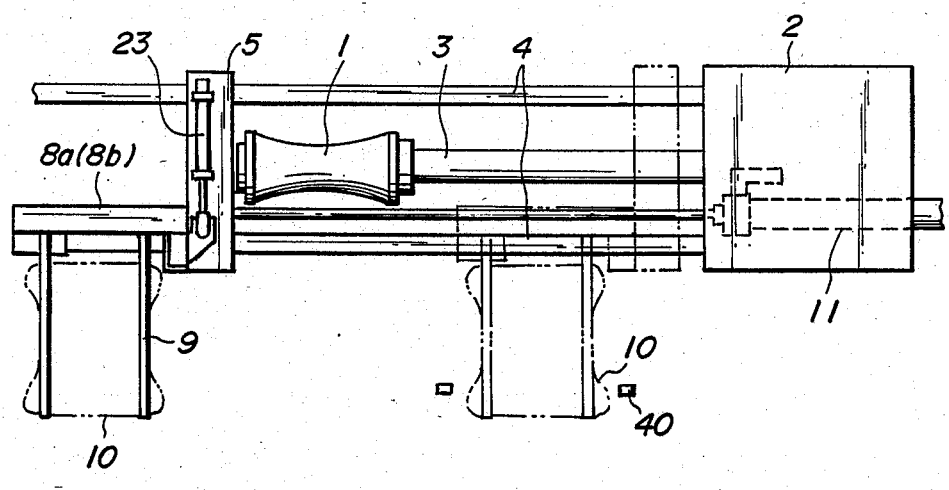

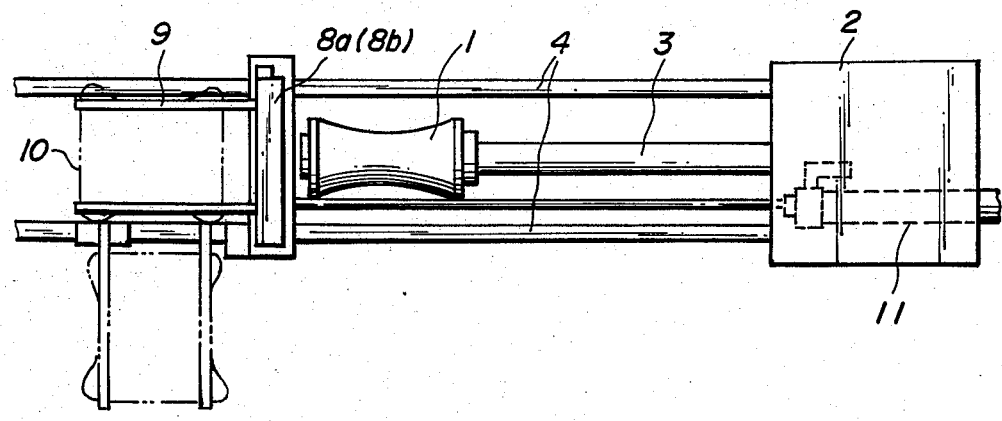
FIG_3c
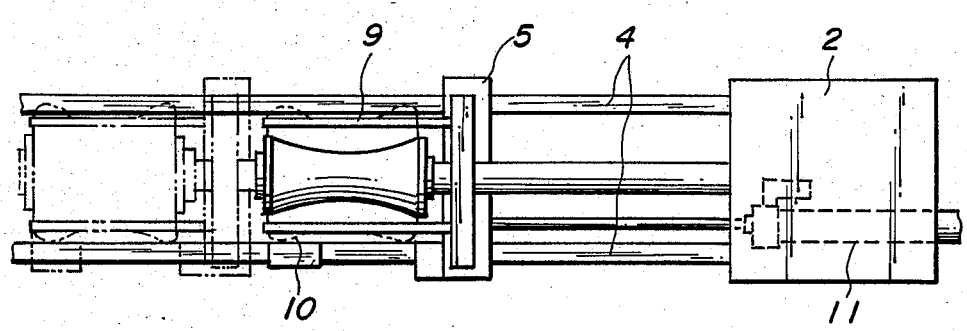
FIG_3d

FIG_3e
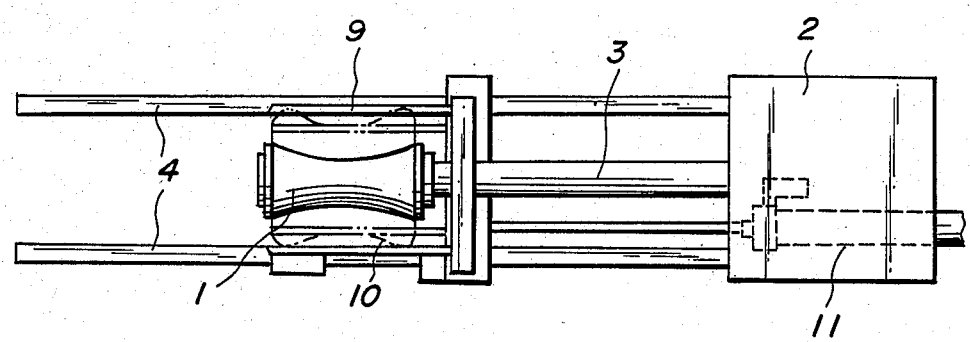
FIG_3f
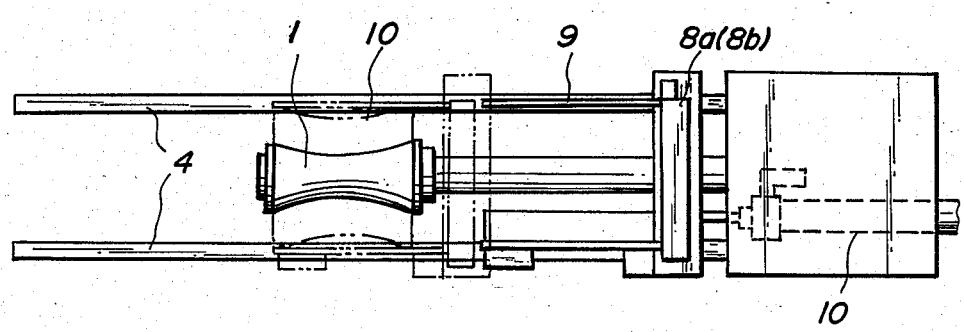
FIG_3g
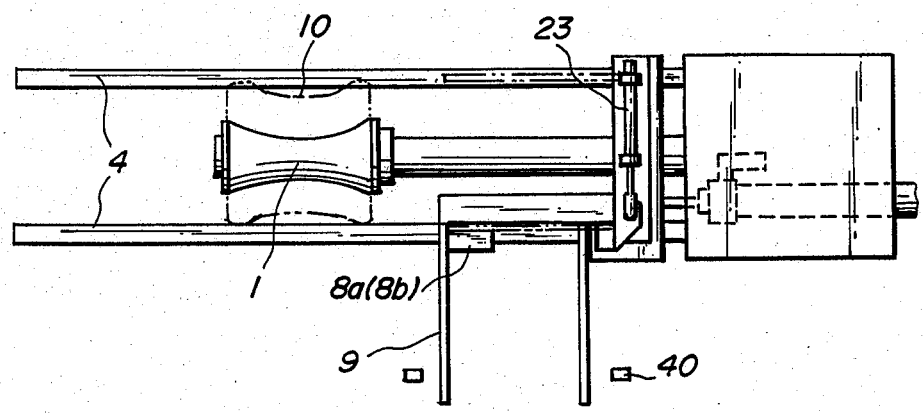

RADIAL TIRE FORMING BLANK SUPPLY APPARATUS

BACKGROUND OF THE INVENTION

1. Field of the Invention

This invention relates to an apparatus for supplying radial tire blanks to a tire building machine for the purpose of transforming green cases into toroidal shapes and joining tread bands onto the toroidal green cases.

2. Description of the Prior Art

A radial tire includes ply cords of a carcass, which reinforce the tire and are arranged in a plane including a tire rotating axis (namely a radial plane) or a plane slightly oblique to the plane. In view of the so-called hoop effect caused by a belt surrounding the carcass, cords of the belt are generally arranged at very slight angles to a plane perpendicular to the above radial plane. In manufacturing the radial tire, in general, the following processes have been effected. Cord plies mainly for a carcass are turned up so as to enclose a pair of beads and joined to a green rubber member about a building drum to form a so-called generally cylindrical green case. On the other hand, ends of cord layers are joined to form endless cord layers to be adapted to a crown portion of the green case when it is transformed into a toroidal shape. An extruded unvulcanized rubber is then applied onto the endless cord layers to form a so-called tread band. The green case and the tread band are combined on a forming drum to form a so-called green tire which is then subjected to forming and vulcanization in a vulcanizing apparatus.

In these processes, there are two forming steps, that is, for the green case and for the green tire. The latter forming step for the green tire is often referred to as "second forming step". Heretofore, there has been great loss of time in transferring and handling the green case for the second forming step. Accordingly, it has been expected for long years to propose a mechanism for supplying tire forming blanks to a tire building machine which eliminates the loss of time to improve the productivity of tires.

SUMMARY OF THE INVENTION

It is a primary object of the invention to provide an improved radial tire forming blank supply apparatus capable of preparing a next green case on the apparatus without any loss of time during or after an application of a tread band.

In order to achieve the object, the radial tire forming blank supply apparatus for use in a radial tire building machine including a forming drum for transforming a green case as a radial tire forming blank into a toroidal shape and joining a tread band onto the toroidal green case, a main carriage reciprocatively moving below said forming drum along guide rails parallel to a rotating axis of said forming drum to fit said green case onto said forming drum, and a sub-carriage for applying said tread band onto an outer circumference of said green case in movement of said sub-carriage toward said forming drum according to the invention comprises a column rotatable about a vertical axis spaced from the rotating axis of the forming drum, a pair of cantilever beams one above the other provided on said column, and two pairs of bar-like clamps, each pair being secured to each said cantilever beam and movable radially toward and away from each other to clamp and release said green case therebetween.

In a preferred embodiment of the invention, bell cranks are provided on and near both ends of each the cantilever beam and connected by a retractable cylinder to each other, and each the bar-like clamp is secured to each the bell crank.

With the above arrangement according to the invention, after a green case has been set on a forming drum, it does not obstruct the return movement and return rotation of the main carriage to its initial position and a next green case can be rapidly prepared without any interference with the sub-carriage for applying a tread band. Accordingly, the guide rails for the main carriage can be commonly used for the sub-carriage, so that the construction of the supply apparatus can be simplified.

In order that the invention may be more clearly understood, preferred embodiments will be described, by way of example, with reference to the accompanying drawings.

BRIEF DESCRIPTION OF THE DRAWINGS

FIG. 1 is a plan view of a tire building machine including a supply apparatus according to the invention;

FIGS. 2a, 2b and 2c are front, side and plan views of a main carriage of the supply apparatus according to the invention; and FIGS. 3a–3g are plan views for explaining respective steps of the operation of the supply apparatus according to the invention.

DETAILED DESCRIPTION OF THE PREFERRED EMBODIMENT

FIG. 1 illustrates in a plan view a tire building machine as a whole, which comprises a forming drum 1, a headstock 2 for the forming drum 1, a spindle 3, a pair of guide rails 4 arranged in parallel with a rotating axis of the forming drum 1, a main carriage 5, a sub-carriage 6, a jointing drum 12 for tread bands, a headstock 13 for the jointing drum 12 and a stitcher 14. The tire blank supply apparatus according to the invention comprises a column 7, a pair of cantilever beams 8a and 8b arranged one above the other, and bar-like clamps 9 supporting a green case 10 shown in phantom lines. Reference numeral 11 denotes a retractable cylinder for moving the main carriage 5.

According to the invention, after a green case 10', shown in chain lines, has been embraced by the bar-like clamps 9 supported by the main carriage 5 located at a position shown in solid lines in FIG. 1, the green case is advanced into a position indicated in phantom lines in a direction shown by an arrow α along the guide rails 4 by an extension of the cylinder 11. In this position, the cantilever beams 8 and 9 are rotated together with the column 7 about its pivotal axis as shown by an arrow β. Thereafter the green case 10 is retracted in a direction opposite to the direction of the arrow along the guide rails 4 by a retraction of the cylinder 11, while the green case 10 is fitted on the forming drum 1. The main carriage 5 is then returned to its original position shown in solid lines in FIG. 1, leaving the green case on the forming drum 1. In the original position of the main carriage, the cantilever beams 8 and 9 and the column 7 are rotated into their original position as shown in solid lines in FIG. 1. In this manner, the cantilever beams in this position are ready for receiving a next green case 10', so that the next green case is received without affecting the processing of the green case 10 on the forming drum 1.

The green case 10 on the forming drum 1 is subjected to the following processes. The green case 10 is transformed into a toroidal shape while a tread band (not shown) is applied to the green case by a movement of the sub-carriage 6 along the guide rails 4 toward the right as viewed in FIG. 1. The tread band is then joined to the green case by means of the stitcher 14. The green tire (not shown) thus produced is transferred away from the tire building machine.

Thereafter, the green tire is loaded in a vulcanizing apparatus for forming and vulcanizing it. It is of course understood that the tread band is previously prepared by steps of joining ends of rubber coated cord cloths on a joining drum 12 to form an endless belt and applying an extruded tread rubber on the belt.

FIGS. 2a–2c illustrate the main carriage in detail. It comprises a frame 15 formed by hollow rectangular structural steel members integrally jointed in T-shape in a plan view. To a lower surface of the T-shaped frame 15 are secured through base plates 16a, 16b and 16c three sliders 17a, 17b and 17c adapted to engage the guide rails in a dovetail fit. Onto a crossing point of the T-shaped steel members of the frame 15 a pivot bearing cylinder 18 is fixed in which a lower end of the column 7 is supported through radial bearings 19 and 20 so as to rotate about a vertical axis.

A rib-reinforced flange 21 is fixed to the column 7 immediately above the pivot bearing cylinder 18. On the other hand, a bracket 22 is fixed to the frame 15 at one end remote from the pivot bearing cylinder 18. A retractable cylinder 23 is connected between the bracket 22 and the rib-reinforced flange 21 to cause the column to rotate about its vertical axis by extension and retraction of the cylinder 23. The column 7 is provided with a bent tongue 24 extending downward from a side face of the column 7. Adjustable stoppers 27 and 28 are respectively secured to brackets 25 and 26 fixed to the frame 15 diagonally opposite to each other besides the pivot bearing cylinder 18. These adjustable stoppers 27 and 28 determine the extreme positions of the rotated column 7 (FIG. 2c). Reference numeral 29 denotes a damper.

The column is provided on its upper portion with a pair of cantilever beams 8a and 8b one above the other on both sides of a horizontal plane including the rotating axis of the forming drum 1. A pair of brackets 30 and 31 are fixed to each cantilever beam 8a or 8b near both its ends. A bell crank 33 or 34 is pivotally connected at 32 to each the bracket 30 or 31. The bar-like clamp 9 is fixed to one end of each the bell crank 33 or 34 so as to horizontally extend perpendicularly to a plane including the pair of cantilever beams 8a and 8b. The other ends of the bell cranks 33 and 34 connected to each cantilever beam 8a or 8b are connected by a retractable cylinder 35. The bell cranks 33 and 34, the bar-like clamps 9 and retractable cylinders 35 are arranged in symmetry with respect to the pair of cantilever beams 8a and 8b. Adjustable stoppers 37 and 38 are secured to inner surfaces of end members 36a and 36b fixed to free ends of the cantilever beams 8a and 8b and to an opposite surface of the column 7 to limit angular displacements of the bell cranks 33 and 34 and hence radial displacements of the bar-like clamps 9. Reference numeral 39 denotes stoppers for positioning a green case.

It should be understood that a green case 10 is inserted in a longitudinal direction of the bar-like clamps 9 into a space defined by the clamps 9 in an expanded position and then the bar-like clamps 9 are moved toward each other by means of the retractable cylinders 35, whereby the green case is held by the four clamps.

First, the green case 10 is held in its initial position as shown in FIG. 3a. If the green case 10 is brought into this position by a suitable automatic transferring machine (not shown), a detector for example a photoelectric switch 40 is provided to detect the transferred green case and then the retractable cylinders 35 actuated.

Then the main carriage 5 (in phantom lines in FIG. 3b) is advanced on the guide rails to the position in solid lines by means of the retractable cylinder 11 as shown in FIG. 3b. In this position, the column 7 is rotated about the vertical axis as shown in FIG. 3c. Thereafter, the main carriage is retracted along the guide rails by means of the retractable cylinder 11. When the green case 10 has been brought onto the forming drum 1 in registry with each other, the cylinder 11 is once stopped as shown in FIG. 3d because it has a braking device which makes the carriage 5 stop at any intermediate position.

In this position, the bar-like clamps 9 are moved away from each other so as to release the green case 10, so that the green case 10 is supported by the forming drum 1 instead of the bar-like clamps 9 as shown in FIG. 3e.

Then the main carriage 5 begins to retract, leaving the green case 10 thereat so as to return to the initial position as shown in FIG. 3f. In this position, the column 7 is rotated into the position shown in FIG. 3g where the carriage is ready for receiving a next green case. During the above processes, it is clearly evident that the main carriage 5 does not interfere with the operation for transforming the green case arranged on the forming drum 1 and the operation of the sub-carriage 6 for application of tread bands.

As can be seen from the above description, according to the invention the main carriage serving to fit a green case onto the forming drum does not interfere with any process steps to which the green case on the forming drum is subjected, during the interval from the time when the main carriage leaves the forming drum to the time when the main carriage is ready for receiving the next green case, so that the loss of time in transferring and handling the green case is completely eliminated in spite that the guide rails for the main carriage are commonly used for supplying tread bands. Accordingly, the invention can remarkably improve the efficiency in production process of radial tires and contribute to saving space occupied by tire producing installations.

It is further understood by those skilled in the art that the foregoing description is that of preferred embodiments of the disclosed apparatus and that various changes and modifications may be made in the invention without departing from the spirit and scope thereof.

What is claimed is:

1. A radial tire forming blank supply apparatus for use in a radial tire building machine comprising a forming drum for transforming a green case as a radial tire forming blank into a toroidal shape and joining a tread band onto the toroidal green case, a main carriage reciprocatively moving below said forming drum along guide rails parallel to a rotating axis of said forming drum to fit said green case onto said forming drum, and a sub-carriage for applying said tread band onto an outer circumference of said green case by movement of said sub-carriage toward said forming drum, said radial tire forming blank supply apparatus comprising, a column rotatable about a vertical axis spaced from the rotating axis of the forming drum, a pair of cantilever beams one above the other provided on said column, and two pairs of bar-like clamps, each pair being secured to each said cantilever beam and movable radially toward and away from each other to clamp and release said green case therebetween.

2. An apparatus as set forth in claim 1, wherein said main carriage is formed as a T-shaped frame which is provided on its lower surface with sliders engaging said guide rails.

3. An apparatus as set forth in claim 2, wherein onto a crossing point of said T-shaped frame is fixed a pivot bearing cylinder in which said column is supported so as to be rotatable about its vertical axis.

4. An apparatus as set forth in claim 1, wherein a retractable cylinder is connected at its one end with a flange provided on said column and at the other end with a bracket arranged on the main carriage to cause said column to rotate about its vertical axis by extension and retraction of said retractable cylinder.

5. An apparatus as set forth in claim 4, wherein a tongue is provided on said column and stoppers are provided on said carriage to determine extreme positions of the rotated column by the abutment of the tongue and the stoppers and at least one damper is provided on said carriage to damp shock of said tongue against said stopper.

6. An apparatus as set forth in claim 1, wherein bell cranks are provided on near both ends of each said cantilever beam and connected by a retractable cylinder to each other, and each said bar-like clamp is secured to each said bell crank.

7. An apparatus as set forth in claim 6, wherein each bracket for each the bar-like clamp is fixed to each the cantilever beam and each the bell crank is pivotally secured to said bracket, and wherein each said bar-like clamp is secured to one end of the bell crank and one end of said retractable cylinder is connected to the other end of said bell crank.

8. An apparatus as set forth in claim 6, wherein said bell cranks, said bar-like clamps and said retractable cylinders are arranged in symmetry with respect to said pair of cantilever beams.

9. An apparatus as set forth in claim 6, wherein stoppers are provided to limit angular displacement of said bell cranks and hence radial displacement of said bar-like clamps.

* * * * *